United States Patent [19]
Fuji et al.

[11] 4,018,963
[45] Apr. 19, 1977

[54] LARGE LIGHTWEIGHT GYPSUM ARTICLE AND A PROCESS FOR THE PRODUCTION THEREOF

[75] Inventors: Masanobu Fuji, Sagamihara; Kuniomi Suzuki, Tokyo, both of Japan

[73] Assignee: Taisei Kensetsu Kabushiki Kaisha, Japan

[22] Filed: May 20, 1975

[21] Appl. No.: 579,325

[30] Foreign Application Priority Data

May 21, 1974 Japan .............................. 49-56134

[52] U.S. Cl. .............................. 428/294; 106/109; 106/110; 106/111
[51] Int. Cl.² ........................................ D04H 13/00
[58] Field of Search ................. 106/109, 110, 111; 428/294

[56] References Cited

UNITED STATES PATENTS

| | | | |
|---|---|---|---|
| 1,338,117 | 4/1920 | Adamson | 106/109 |
| 2,285,098 | 6/1942 | Schoch | 106/109 |
| 2,871,134 | 1/1959 | Loechl | 106/110 |
| 3,372,040 | 3/1968 | Ware | 106/111 |
| 3,445,323 | 5/1969 | Schnabel | 106/109 |
| 3,520,708 | 7/1970 | Prytherch | 106/110 |
| 3,616,173 | 10/1971 | Green | 106/109 |
| 3,625,724 | 12/1971 | Alvero | 106/111 |
| 3,769,052 | 10/1973 | Kurtz | 106/111 |

*Primary Examiner*—Winston A. Douglas
*Assistant Examiner*—John P. Sheehan
*Attorney, Agent, or Firm*—Wenderoth, Lind & Ponack

[57] ABSTRACT

A large lightweight gypsum article comprising anhydrous or hemihydrous gypsum, ettringite, reinforcing members, and, if necessary, fibers and/or light-weight aggregate.

22 Claims, No Drawings

LARGE LIGHTWEIGHT GYPSUM ARTICLE AND A PROCESS FOR THE PRODUCTION THEREOF

BACKGROUND OF THE INVENTION

This invention relates to a large lightweight gypsum article which has hitherto been difficult to obtain. The gypsum article, not only is large and lightweight but also has low expansion coefficient and further has improved fire- and water-resistance. More particularly, it relates to a large lightweight gypsum article comprising anhydrous or hemihydrous gypsum, ettringite, reinforcing members, and, if necessary, fibers and/or lightweight aggregate.

DESCRIPTION OF THE PRIOR ART

Heretofore, many problems were encountered in using gypsum ($CaSO_4.2H_2O$) as building material. The gypsum generates heat and expands upon hardening. Thus, if large construction members such as an all-white, thick member (e.g.) 10 cm- or 15 cm- thick), a member having locally irregular and greatly different thicknesses or a member moulded in a rigid moulding box is made of gypsum, problems such as occurrence of fissures and difficulty of release occur. Even if steel members are inserted for reinforcement, problems such as occurrence of rust and insufficiency of adhesion arise, and thus it has been deemed to be very difficult to use reinforcement members for gypsum in the same manner as in the case of reinforced concrete.

SUMMARY OF THE INVENTION

It is therefore a primary object of the present invention to provide a novel gypsum article which is large and lightweight and is free of the faults of prior art gypsum materials.

It has been found through much research that the addition of ettringite ($3CaO.Al_2O_3.3CaSO_4.32H_2O$) can solve the above problems and enable obtention of a large and lightweight gypsum article which has low expansion coefficient and improved fire- and water-resistance. Thus the present invention relates to a large lightweight gypsum article comprising anhydrous or hemihydrous gypsum, ettringite, reinforcing members, and, if necessary, fibers and/or lightweight aggregate.

The ettringite has a large affinity for gypsum and also has a large amount of water of crystallization, and so expansion coefficient of the article is low and occurrence of fissures in the article at the time of hardening can be prevented.

Furthermore, the presence of ettringite serves to make the blend alkaline, and for this reason the rust prevention treatment of the reinforcement members to be inserted is simplified, and also at the same time serves to secure adhesion of the members. Thus, the reinforcement members act effectively, and that arrangement of reinforcement members in the material has been made possible in turn makes it possible to mould large articles.

It is an additional merit of the present invention that since ettringite is lighter than gypsum, articles can be made lightweight also by the inclusion of ettringite per se.

The ettringite also serves to improve fire resistance of the construction material because it has a large amount of water of crystallization, and it contributes to the waterproofness of the construction material because, unlike gypsum, it does not dissolve in water. Thus, the present invention has many advantages over the prior art.

The present invention also relates to the process for the production of a large lightweight gypsum article, which comprises hardening a material prepared by blending anhydrous or hemihydrous gypsum, ettringite, water and, as occasion demands, fibers and/or lightweight aggregates and arranging reinforcing members in the blend, in a mould.

A large and lightweight gypsum article can thus be produced as simply as in the case of producing mortar or concrete to obtain a hardened article which can be very complicated in shape.

DETAILED DESCRIPTION

As the preferred reinforcing members, may be mentioned such members as steel members treated with a rust preventive or aluminous members. The steel members are particularly steel round bars of 3.2 to 22 mm in diameter treated with a rust preventive.

The fibers may be either inorganic or organic ones. The inorganic fibers are, for example, carbon fibres, aluminous fibres or glass fibers, and the organic fibres, for example, polyamides, polyester, acrylic or polyalkylene or rayon fibers. These inorganic or organic fibers are preferably of 2-25 microns in diameter and 3-25 mm in length.

The lightweight aggregate may be a natural lightweight aggregate, a modified or coated natural lightweight aggregate or an artificial lightweight aggregate. It is, for example, lapilli, volcanic ash and modification thereof or those coated with cement slurry; and expanded shale, clay, perlite or coal ash, preferably of 0.3 – 20 mm in diameter, as available in the market under the name of LECA or MESALITE.

The ettringite to be used in the present invention has a large specific heat value and includes a large amount of water in its crystal, and may be produced by a method in itself known. It can be produced, for example, by admixing water with the blended component materials such as (i) aluminous cement plus gypsum, (ii) lime plus gypsum plus bauxite, (iii) lime plus gypsum plus aluminous red mud, (iv) lime plus gypsum plus aluminous sludge or (v) any other combinations of component materials necessary for the formation of the ettringite illustrated by the following equation:

$$6CaO + Al_2O_3 + 3SO_3 + 32H_2O \rightarrow 3CaO.Al_2O_3.3CaSO_4.32H_2O$$

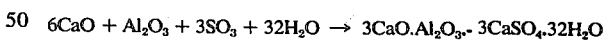

The obtained paste-like product may be used directly or after drying it at an elevated temperature such as 400°–600° C for a sufficient period of time, e.g., 30 minutes, into dry powder.

The ettringite ordinarily is used in an amount of about 10–100, preferably 30–70 weight percent of the amount of gypsum.

Additives usually used for gypsum articles, such as a hardening retarder, for example, potassium citrate, citric acid and calcium 2-keto- gluconate; or a dispersant may also be used without impairing the effects of the present invention.

The following are specific embodiments of the present invention, which embodiments are designed to illustrate, but not to limit the scope of the present invention.

EXAMPLE

Hemihydrous gypsum (class B of JIS R-9111; for the mould of ceramic material), ettringite, chopped glass fibres CS06HB710 (product of Asahi Fibre Glass Co., Ltd. of Japan; about 9 microns in diameter and about 6 mm in length), potassium citrate as hardening retarder, MERMENT L10 (product of Showa Denko K.K., Japan; a liquid additive containing no chlorine and having the effect of dispersing gypsum particles at the hydration thereof) as dispersing agent and water are blended together in such proportions as shown in the following Table 1, and then moulded to obtain samples of the present invention. Their physical properties are as shown in the Table.

Ettringite used in producing the above samples is a paste-like product prepared by blending an aluminous sludge (discharged from the surface treatment of aluminium), gypsum and lime in a proportion of 1:3:3 (when calculated as $Al_2O_3$, $CaSO_4$ and $CaO$) in the presence of water.

The sample materials shown in Table 1 in which said ettringite has been incorporated are alkaline and show a pH of 10 – 12, so rust prevention treatment for the steel bars to be inserted is simplified, and at the same time, adhesion of the bars is secured. Table 2 compares the bonding strength between ordinary concrete and steel with that between sample No. 3 of Table 1 and steel.

Table 1

| Sample No. | 1 | 2 | 3 | |
|---|---|---|---|---|
| Hemi-hydrous gypsum | 565 | 675 | 806 | (Kg) |
| Ettringite | 351 | 284 | 256 | (Kg) |
| Fibers | 5.7 | 6.8 | 8.1 | (Kg) |
| Retarder | 34 | 20.3 | 48.4 | (l) |
| Dispersant | 28.3 | 33.8 | 40.3 | (l) |
| Water | 487 | 508 | 430 | (l) |
| Specific gravity | 1.07 | 1.13 | 1.26 | |
| Bending strength | 48 | 50 | 53 | (Kg/cm²) |
| Compression strength | 80 | 112 | 174 | (Kg/cm²) |
| Expansion Coefficient (after 24 hrs.) | — | — | *0.009 | (%) |

*0.1 – 0.2 % in an ordinary gypsum article

Table 2

| | Ordinary concrete | Sample No. 3 |
|---|---|---|
| Round steel bar φ 9 mm (with anticorrosive paint on) | *19 (Kg/cm²) | 34.6 (Kg/cm²) |
| Deformed steel bar D-10 (zinc-plated) | **54 (Kg/cm²) | 48.3 (Kg/cm²) |

*in case the compressive strength is 130 Kg/cm²
**in case the compressive strength is 167 Kg/cm²

A large (3.6 m × 2.4 m), sashed wall plate and a large (4.0 m × 1.6 m), beamed roof plate are produced according to the process of the present invention in the manner per se the same as in the case of producing reinforced concrete construction members, but neither fissures nor separation of embedded components occur.

We claim:

1. A large lightweight fire-resistant gypsum article which comprises anhydrous or hemihydrous gypsum, ettringite and reinforcing members, the weight ratio of said ettringite to the gypsum being 10 to 100%.
2. A gypsum article according to claim 1 wherein said reinforcing members are steel or aluminous.
3. A gypsum article as claimed in claim 2, wherein the reinforcing members are round steel bars of 3.2 to 22 mm in diameter, treated with a rust preventive.
4. A gypsum article as claimed in claim 1, which further comprises carbon, aluminous, glass, polyamide, polyester, acrylic, polyalkylene and rayon fibers.
5. A gypsum article as claimed in claim 4 wherein the fibers comprise those of 2–25 microns in diameter and 3–25 mm in length.
6. A gypsum article as claimed in claim 1, further comprising lightweight aggregate.
7. A gypsum article as claimed in claim 6, wherein the lightweight aggregate is a natural lightweight aggregate or an artificial lightweight aggregate.
8. A gypsum article as claimed in claim 7, wherein the aggregate is selected from the group consisting of lapilli, volcanic ash, expanded shale, clay, perlite and coal ash.
9. A gypsum article as claimed in claim 8, wherein said aggregate has a particle size of 0.3–20 mm in diameter.
10. A gypsum article as claimed in claim 1, further comprising a hardening retarder or dispersant.
11. A gypsum article as claimed in claim 1, wherein said weight ratio of etteringite to gypsum is 30 to 70%.
12. A process for the production of a large lightweight fire-resistant gypsum article wherein anhydrous or hemihydrous gypsum, ettringite and water are blended and reinforcing members are arranged in the blend as it is hardened, the weight ratio of said ettringite to the gypsum being 10 to 100%.
13. A process according to claim 12 wherein said reinforcing members are steel or aluminous.
14. A process as claimed in claim 12, wherein the reinforcing members are round steel bars of 3.2 to 22 mm in diameter, treated with a rust preventive.
15. A process as claimed in claim 12, wherein said blend further comprises carbon, aluminous, glass, polyamide, polyester, acrylic, polyalkylene or rayon fibers.
16. A process as claimed in claim 15, wherein said fibers comprise those of 2–25 microns in diameter and 3–25 mm in length.
17. A process as claimed in claim 12, wherein said blend further comprises lightweight aggregate.
18. A process as claimed in claim 17, wherein the lightweight aggregate is a natural lightweight aggregate or an artificial lightweight aggregate.
19. A process as claimed in claim 18, wherein the aggregate is selected from the group consisting of lapilli, volcanic ash, expanded shale, clay, perlite and coal ash.
20. A process as claimed in claim 19, wherein the aggregate has a particle size of 0.3–20 mm in diameter.
21. A process as claimed in claim 12, wherein said blend further comprises a hardening retarder or dispersant.
22. A process as claimed in claim 12, wherein said weight ratio of etteringite to gypsum is 30 to 70%.

* * * * *